US009107230B2

United States Patent
Jin et al.

(10) Patent No.: US 9,107,230 B2
(45) Date of Patent: Aug. 11, 2015

(54) METHOD, DEVICE AND SYSTEM FOR SCHEDULING DATA FLOW

(71) Applicant: HUAWEI TECHNOLOGIES CO., LTD., Shenzhen (CN)

(72) Inventors: Weisheng Jin, Shanghai (CN); Hai Liu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 178 days.

(21) Appl. No.: 13/761,543

(22) Filed: Feb. 7, 2013

(65) Prior Publication Data

US 2013/0148605 A1    Jun. 13, 2013

Related U.S. Application Data

(63) Continuation of application No. PCT/CN2011/074408, filed on May 20, 2011.

(30) Foreign Application Priority Data

Aug. 10, 2010  (CN) .......................... 2010 1 0249588

(51) Int. Cl.
*H04W 72/10* (2009.01)
*H04W 72/12* (2009.01)
*H04L 12/851* (2013.01)

(52) U.S. Cl.
CPC ........... *H04W 72/10* (2013.01); *H04L 47/2408* (2013.01); *H04W 72/1242* (2013.01)

(58) Field of Classification Search
None
See application file for complete search history.

(56) References Cited

U.S. PATENT DOCUMENTS

| 7,002,918 B1 | 2/2006 | Prieto et al. |
| 7,672,236 B1 | 3/2010 | Karunakaran et al. |
| 8,634,840 B2 * | 1/2014 | Lindskog et al. ............. 455/450 |
| 2002/0031089 A1 | 3/2002 | Elloumi et al. |
| 2006/0215612 A1 | 9/2006 | Chemiakina et al. ......... 370/332 |
| 2007/0217357 A1* | 9/2007 | Kitakado ..................... 370/329 |

(Continued)

FOREIGN PATENT DOCUMENTS

| CN | 101047640 | 10/2007 |
| CN | 101355513 | 1/2009 |

(Continued)

OTHER PUBLICATIONS

Written Opinion of the International Searching Authority, dated Sep. 1, 2011, in corresponding International Application No. PCT/CN2011/074408 (5 pp.).

(Continued)

*Primary Examiner* — Hassan Phillips
*Assistant Examiner* — Duc Duong
(74) *Attorney, Agent, or Firm* — Staas & Halsey LLP

(57) ABSTRACT

Embodiments of the present invention provide a method, device, and system for scheduling a data flow, which are used to improve the processing efficiency. A network side device marks a priority of a subsequent uplink and/or downlink data flow of a UE corresponding to a downlink data packet in the downlink data packet, and enables a downstream node to schedule an access network resource or air interface resource according to the priority. Therefore, a bearer does not need to be modified during the process of distinguishing different service flows and performing differentiation scheduling on different service flows, thereby reducing the workload and improving the processing efficiency.

10 Claims, 3 Drawing Sheets

(56) References Cited

U.S. PATENT DOCUMENTS

| | | | |
|---|---|---|---|
| 2008/0020775 A1* | 1/2008 | Willars | 455/445 |
| 2008/0025218 A1* | 1/2008 | Liu | 370/235 |
| 2008/0181150 A1* | 7/2008 | Won et al. | 370/310 |
| 2009/0238192 A1 | 9/2009 | Dolganow et al. | 370/400 |
| 2009/0269913 A1 | 10/2009 | Terry et al. | 438/558 |
| 2009/0296613 A1 | 12/2009 | Kahn et al. | |
| 2010/0020757 A1* | 1/2010 | Walton et al. | 370/329 |
| 2010/0067400 A1 | 3/2010 | Dolganow et al. | |
| 2011/0038264 A1* | 2/2011 | Ishii | 370/238 |
| 2012/0182910 A1* | 7/2012 | Nakashima et al. | 370/281 |
| 2013/0115979 A1* | 5/2013 | Zhu et al. | 455/458 |
| 2013/0136091 A1* | 5/2013 | Ludwig et al. | 370/329 |

FOREIGN PATENT DOCUMENTS

| | | |
|---|---|---|
| CN | 101599895 | 12/2009 |
| JP | 2002-16646 | 1/2002 |
| JP | 2003-521138 | 7/2003 |
| JP | 2011-515939 A | 5/2011 |
| RU | 2007 113 617 A | 10/2008 |
| WO | WO 01/05100 A1 | 1/2001 |
| WO | 2009/116020 A2 | 9/2009 |
| WO | 2009/148539 A1 | 12/2009 |

OTHER PUBLICATIONS

Korean Office Action dated Mar. 13, 2014 in corresponding Korean Patent Application No. 10-2013-7006227.

Russian Office Action mailed Apr. 3, 2014, in corresponding Russian Patent Application No. 2013110329/07.

Extended European Search Report mailed Oct. 28, 2013 in corresponding European Application No. 11777221.0.

Japanese Office Action issued Jan. 7, 2014, in corresponding Japanese Patent Application No. 2013-523473.

International Search Report of Corresponding PCT Application PCT/CN2011/074408 mailed Sep. 1, 2011.

Chinese Office Action issued Mar. 12, 2014, in corresponding Chinese Patent Application No. 201010249588.6.

Japanese Office Action mailed Aug. 26, 2014, in corresponding Japanese Patent Application No. 2013-523473.

* cited by examiner

METHOD, DEVICE AND SYSTEM FOR SCHEDULING DATA FLOW

CROSS-REFERENCE TO RELATED APPLICATIONS

This application is a continuation of International Application No. PCT/CN2011/074408, filed on May 20, 2011, which claims priority to Chinese Patent Application NO. 201010249588.6, filed on Aug. 10, 2010, both of which are incorporated herein by reference in its entirety.

FIELD OF TECHNOLOGY

The present invention relates to the field of communications technologies, and in particular to a method, device, and system for scheduling a data flow.

BACKGROUND

With the evolution of mobile communication technologies, more and more Internet services can be used in mobile communication. In the new generation mobile communication, a user can use all Internet services as in the fixed broadband communication. In the prior art, different Internet service flows of the same mobile user are transmitted between a user equipment (UE) and a packet data gateway (GGSN/PGW) through the same end-to-end bearer, and different service flows transmitted by the same bearer cannot be directly distinguished during air interface scheduling. In order to distinguish different service flows, different scheduling manners are adopted for different services. In the prior art, a deep packet inspection (DPI) device may be deployed on a gateway node of a user plane of a core network or in a service network to perform service flow identification. The DPI device on the gateway node of the core network or the independent DPI device in the service network performs deep inspection on a data packet. Then an inspection result is notified to an application function (AP) of a policy and charging control (Policy and Charging Control, PCC) system or a policy and charging rule function (Policy and Charging Rule Function, PCRF), and the PCC system triggers a process of establishing or modifying a bearer, so that service flows with different QoS requirements are bound into different end-to-end bearers of corresponding QoS values and transmitted. A node of an access network performs scheduling according to a QoS attribute of a bearer, so as to achieve the objective of performing distinguishing and differentiation scheduling on different service flows.

In the prior art, at the time of distinguishing different service flows and performing differentiation scheduling on different service flows, the workload of the PCC system to modify a bearer is large, and the processing efficiency is low.

SUMMARY

Embodiments of the present invention provide a method, device, and system for scheduling a data flow, which are used to improve the processing efficiency.

An embodiment of the present invention provides a method for scheduling a data flow, including:

marking, by a network side device, in a priority marking field in a downlink data packet sent to a user equipment UE, a priority of a subsequent uplink and/or downlink data flow of the UE corresponding to the downlink data packet; and sending the downlink data packet, so that a downstream node schedules an access network resource or air interface resource for the subsequent uplink and/or downlink data flow according to the priority.

An embodiment of the present invention provides a method for scheduling a data flow, including:

receiving, by a network side device, a forwarded downlink data packet of a UE;

inspecting a priority marking field in the forwarded downlink data packet; and scheduling an access network resource or air interface resource according to a priority of a subsequent uplink and/or downlink data flow of the UE corresponding to the downlink data packet, where the priority is marked in the priority marking field.

An embodiment of the present invention provides a device for scheduling a data flow, including:

a marking module, configured to mark, in a priority marking field in a downlink data packet sent to a user equipment UE, a priority of a subsequent uplink and/or downlink data flow of the UE corresponding to the downlink data packet; and a sending module, configured to send the downlink data packet, so that a downstream node schedules an access network resource or air interface resource for the subsequent uplink and/or downlink data flow according to the priority.

An embodiment of the present invention provides a device for scheduling a data flow, including:

a forwarding module, configured for a network side device to receive a forwarded downlink data packet of a UE;

an inspecting module, configured to inspect a priority marking field in the forwarded downlink data packet; and a scheduling module, configured to schedule an access network resource or air interface resource according to a priority of a subsequent uplink and/or downlink data flow of the UE corresponding to the downlink data packet, where the priority is marked in the priority marking field.

An embodiment of the present invention provides a system for scheduling a data flow, including:

an upstream network device, configured to mark, in a priority marking field in a downlink data packet sent to a user equipment UE, a priority of a subsequent uplink and/or downlink data flow of the UE corresponding to the downlink data packet; and send the downlink data packet, so that a downstream node schedules an access network resource or air interface resource for the subsequent uplink and/or downlink data flow according to the priority; and a downstream network device, configured for a network side device to receive the forwarded downlink data packet of the UE; inspect the priority marking field in the forwarded downlink data packet; and schedule the access network resource or the air interface resource according to the priority of the subsequent uplink and/or downlink data flow of the UE corresponding to the downlink data packet, where the priority is marked in the priority marking field.

The embodiments of the present invention provide the method, the device and the system for scheduling a data flow. The network side device marks the priority of the subsequent uplink and/or downlink data flow of the UE corresponding to the downlink data packet in the downlink data packet, so that the downstream node is enabled to schedule the access network resource or the air interface resource according to the priority. Therefore, a bearer does not need to be modified during the process of distinguishing different service flows and performing differentiation scheduling on different service flows, thereby reducing the workload and improving the processing efficiency.

BRIEF DESCRIPTION OF THE DRAWINGS

To illustrate the technical solutions in the embodiments of the present invention more clearly, the following briefly describes the accompanying drawings required for describing the embodiments or the prior art. Apparently, the accompanying drawings in the following descriptions show merely some embodiments of the present invention, and persons of ordinary skill in the art may still derive other drawings from the accompanying drawings without creative efforts.

DETAILED DESCRIPTION

Figure 1:
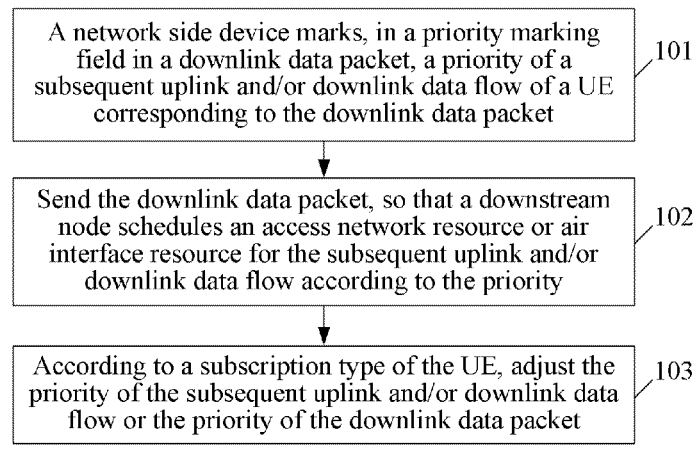
FIG. 1 is a flow chart of a method for scheduling a data flow according to an embodiment of the present invention.

FIG. 1 is a flow chart of a method for scheduling a data flow according to an embodiment of the present invention. This embodiment includes the following:

Step 101: A network side device marks, in a priority marking field of a downlink data packet sent to a user equipment UE, a priority of a subsequent uplink and/or downlink data flow of the UE corresponding to the downlink data packet.

Step 102: Send the downlink data packet, so that a downstream node schedules an access network resource or air interface resource for the subsequent uplink and/or downlink data flow according to the priority.

Figure 2:
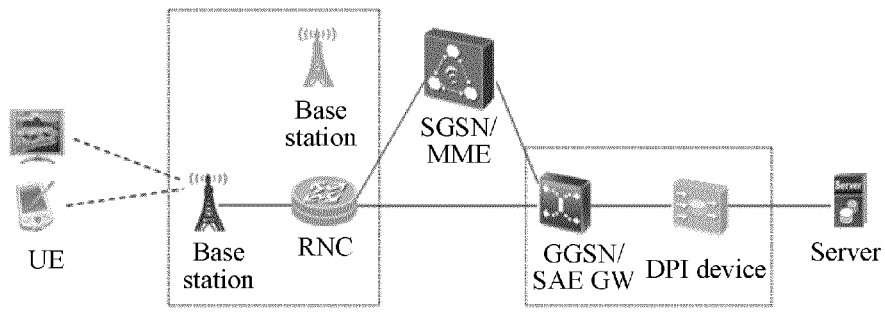
FIG. 2 is a topological structure diagram of a system which executes an embodiment of the present invention.

An executing object of the embodiment of the present invention is the network side device, for example, may be a DPI device. The DPI device, for example, may include a DPI module integrated in a GGSN/SAE GW, an SGSN/MME, or an independent DPI device. FIG. 2 is a topological structure diagram of a system which executes the embodiment of the present invention. The SGSN/MME is a serving GPRS (general packet radio service) support node/mobility management entity, and the GGSN/SAE GW is a gateway GPRS node/system architecture evolution gateway.

As shown in the figure, the DPI device may be independent or may also be integrated with the GGSN/SAE GW. Transmission from a server to the GGSN/SAE GW is performed through an IP network. Transmission from the GGSN/SAE GW to a base station is performed through a bearer.

In the embodiment of the present invention, firstly the priority of the subsequent uplink and/or downlink data flow of the UE corresponding to the downlink data packet is marked in the priority marking field in the downlink data packet. For example, the priority can be classified into eight levels, respectively identified with numbers 1 to 7, where 1 identifies the lowest priority, 7 identifies the highest priority, and besides, 0 is used to identify an unknown priority. It should be noted that, this is only an example, and is not intended to limit the embodiment of the present invention. For example, when the subsequent uplink data flow is the highest priority, the priority marking field in a corresponding downlink data packet may be marked with 7; when the priority of the subsequent downlink data flow is the lowest priority, the priority marking field in a corresponding downlink data packet may be marked with 1. The downstream node may include: a base station, a radio network controller RNC, a radio access network device, or a fixed network device.

The priority marking field of the embodiment of the present invention may include: a differentiated services code point DSCP, type of service TOS, a traffic class Traffic Class, a flow label Flow Label or a field of a GPRS tunneling protocol for bearing the data packet.

Figure 3:
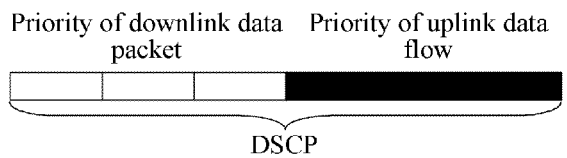
FIG. 3 is a schematic diagram of a marking manner of taking DSCP as an example according to an embodiment of the present invention.
Figure 4:
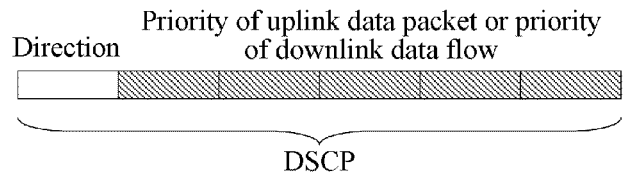
FIG. 4 is a schematic diagram of another marking manner of taking DSCP as an example according to an embodiment of the present invention.

In the embodiment of the present invention, the whole of the priority marking field may be used to mark a priority of the uplink data flow, or may also be used to mark a priority of the downlink data flow, and the priority marking field may also be used to mark both the priority of the uplink data flow and the priority of the downlink data flow at the same time. When priorities of the uplink and downlink data flows are marked at the same time, an agreement with the downstream node may be accomplished, and the agreement is about which downlink data packet marks the priority of the uplink data flow and which downlink data packet marks the priority of the downlink data flow; the agreement also may not be accomplished, and instead, the uplink or the downlink is distinguished in the data packet. The foregoing distinguishing method includes: one part of the priority marking field is used to mark the priority of the subsequent downlink data flow, and the other part is used to mark the priority of the subsequent uplink data flow; or one part of the priority marking field is used to mark the priority of the subsequent downlink data flow or the priority of the subsequent uplink data flow, and the other part is used to mark the uplink or the downlink. For example, the first 3 bits of the DSCP may be used to mark the priority of the uplink data flow, and the last 3 bits of the DSCP may be used to mark the priority of the downlink data flow, which are shown in FIG. 3. Still for example, the first 1 bit of the DSCP may be used to mark whether the priority marking field indicates the uplink or the downlink, and the last 5 bits mark a specific priority value, which are shown in FIG. 4.

Step 103: According to a subscription type of the UE, adjust the priority of the subsequent uplink and/or downlink data flow or the priority of the downlink data packet. For example, when a user is a VIP user, all of the priorities of the downlink data packets of the user may be set to the highest priority, or may be set to a priority one or more levels higher than that of a common user. For example, in an emergency or in a burst state, in order that all services of some particular users are given resource scheduling with the highest level, priorities of all uplink and downlink data packets of the particular users may be directly set to the highest level or a higher level, and at the same time, priorities of all uplink and downlink data packets of other non-particular users are set to the lowest level or a lower level.

Figure 5:
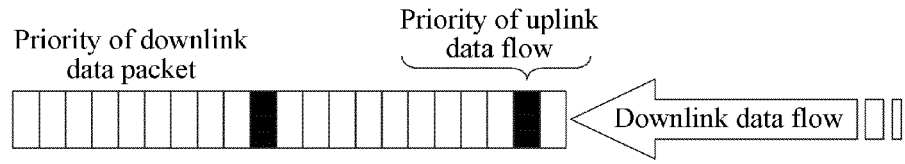
FIG. 5 is a schematic diagram of marking a priority of an uplink service flow once every several data packets according to an embodiment of the present invention.

The priorities of service flows in the embodiment of the present invention may be marked once every several data packets, as shown in FIG. 5.

In the method for scheduling a data flow according to the embodiment of the present invention, the priority of the subsequent uplink and/or downlink data flow of the UE corresponding to the downlink data packet is marked in the downlink data packet, so that the downstream node is enabled to schedule the access network resource or the air interface resource according to the priority. Therefore, a bearer does not need to be modified during the process of distinguishing priorities of different service flows and performing differentiation scheduling on different service flows, thereby reducing the workload and improving the processing efficiency.

Figure 6:
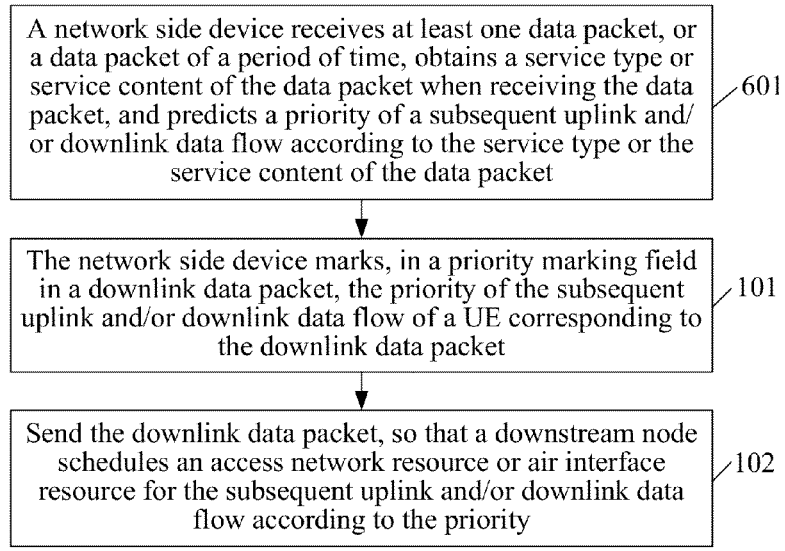
FIG. 6 is a flow chart of another method for scheduling a data flow according to an embodiment of the present invention.

FIG. 6 is a flow chart of another method for scheduling a data flow according to an embodiment of the present invention. This embodiment includes the following:

Step 601: A network side device receives at least one data packet, or a data packet of a period of time, obtains a service type or service content of the data packet when receiving the data packet, and predicts a priority of a subsequent uplink and/or downlink data flow according to the service type or the service content of the data packet. Or Step 602: Set the priority of the subsequent uplink and/or downlink data flow according to a network or operator policy.

Step 101: The network side device marks, in a priority marking field in a downlink data packet sent to a user equipment UE, the priority of the subsequent uplink and/or downlink data flow of the UE corresponding to the downlink data packet.

Step 102: Send the downlink data packet, so that a downstream node schedules an access network resource or air interface resource for the subsequent uplink and/or downlink data flow according to the priority.

An executing object of the embodiment of the present invention is the network side device, for example, may be a DPI device. The DPI device, for example, may include a DPI module integrated in a GGSN/SAE GW, or an independent DPI device. The difference between this embodiment of the present invention and the last embodiment lies in that the step of predicting the priority of a data flow is added.

In the embodiment of the present invention, firstly at least one data packet or a data packet of a period of time is received. When one data packet is received, the data packet is analyzed to obtain a service type of the data packet and record the service type. After at least one data packet is received, a corresponding number of at least one service type is also recorded. Similarly, after the data packet of a period of time is received, a corresponding number of service types are also recorded. In the embodiment of the present invention, the priority of the subsequent uplink data flow may be predicted through the type of the received uplink data packet, the priority of the subsequent downlink data flow may be predicted through the type of the received downlink data packet, the priority of the subsequent uplink data flow may be predicted through the types of the received uplink and downlink data packets, the priority of the subsequent downlink data flow may be predicted through the types of the received uplink and downlink data packets, the priority of the subsequent uplink data flow may be predicted through the content of the received uplink data packet, the priority of the subsequent downlink data flow may be predicted through the content of the received downlink data packet, the priority of the subsequent uplink data flow may be predicted through the content of the received uplink and downlink data packets, and the priority of the subsequent downlink data flow may be predicted through the content of the received uplink and downlink data packets. The embodiment of the present invention is described with an example that the priority of the subsequent uplink data flow is predicted through the type of the received uplink data packet. If there is no specific description, other conditions can be deemed to be the same as the example.

The obtaining a service type of the uplink data packet may include: detecting the service type of the uplink data packet by deep packet inspection DPI; or obtaining an IP address and/or a port of a receiving end of the uplink data packet by shallow packet inspection to obtain a service type corresponding to an IP address and/or a port of a sending end of the downlink data packet according to the set correspondence between an IP address and/or port and a service type. A specific application of the uplink data packet may be detected by deep packet inspection, and thereby the service type of the uplink data packet can be distinguished. Because services provided by some servers are relatively fixed, a service type of a data packet can be accurately conjectured according to IP addresses of these servers. Therefore, if the correspondence between an IP address and a service type is set, an IP address and/or a port of a receiving end of the uplink data packet can be obtained by shallow packet inspection, and a corresponding service type can be found according to the correspondence.

The obtaining service content of the uplink data packet may include: detecting the service content of the data packet by deep packet inspection. A specific application of the uplink data packet may be detected by deep packet inspection, and thereby the service content of the uplink data packet can be identified.

The priority of the subsequent uplink data flow then is predicted according to the service type of the uplink data packet. The predicting method may include: when receiving one uplink data packet, searching for the priority of the uplink data packet according to the correspondence between a service type and a priority, and taking the priority of the uplink data packet as the priority of the subsequent uplink data flow; when receiving at least two uplink data packets, searching for the priority of the at least two uplink data packets according to the correspondence between a service type and a priority, and taking a statistical value of the priority of the at least two uplink data packets as the priority of the subsequent uplink data flow; when receiving an uplink data packet of a period of time, searching for the priority of the uplink data packet of a period of time, and taking a statistical value of the priority of the uplink data packet of a period of time as the priority of the subsequent uplink data flow. The method of searching for the priority of the uplink data packet may include searching for the correspondence between a service type and a priority. The taking the statistical value of the priority of the at least two uplink data packets or the uplink data packet of a period of time as the priority of the subsequent uplink data flow may include the statistical method of computing an arithmetic mean value, a geometric mean value, and a weighted mean value of their priorities.

For example, the correspondence between a service type and a priority may be defined, as shown in the following table:

| HTTP | Flow | FTP | P2P |
|------|------|-----|-----|
| 7    | 6    | 2   | 1   |

It is assumed that HTTP traffic in a period of time is 100%, then the priority of the subsequent uplink data flow in this period of time may be 7 after statistics is taken; it is assumed that Flow traffic in a period of time is 100%, then the priority of the subsequent uplink data flow in this period of time may be 6 after statistics is taken; it is assumed that the HTTP traffic in a period of time is 5% and P2P traffic is 95%, then the priority of the subsequent uplink data flow in this period of time is 1; and it is assumed that the HTTP traffic in a period of time is 95% and the P2P traffic is 5%, then the priority of the subsequent uplink data flow in this period of time is 7.

The priority marking field of the embodiment of the present invention may include: a differentiated services code point DSCP or type of service TOS in IPv4; or a traffic class Traffic Class, a flow label Flow Label or a field of a GPRS tunneling protocol for bearing the data packet in IPv6.

In the embodiment of the present invention, the manner of marking the priority marking field may include the following two types: one part of the priority marking field is used to mark the priority of the downlink data packet, the other part is used to mark the priority of the subsequent uplink data flow, and FIG. 3 is a schematic diagram of a marking manner of taking DSCP as an example according to the embodiment of the present invention; or one part of the priority marking field is used to mark the priority of the downlink data packet or the priority of the subsequent uplink data flow, the other part is used to mark whether the identification indicates the uplink or the downlink, and FIG. 4 is a schematic diagram of a marking manner of taking DSCP as an example according to the embodiment of the present invention. It may also be defined in this embodiment that: when the priority marking field is 0, it indicates that the data packet or data flow is not detected. Therefore, the priority cannot be known. In this case, the priority marking field is 0, representing an intermediate priority.

The embodiment of the present invention may also include the following step:

Step 103: According to a subscription type of the UE, adjust the priority of the subsequent uplink data flow or the priority of the downlink data packet. For example, when a user is a VIP user, all of the priorities of the downlink data packets of the user may be set to the highest priority, or may be set to a priority one or more levels higher than that of a common user. For example, in an emergency or in a burst state, in order that all services of some particular users are given resource scheduling with the highest level, priorities of all uplink and downlink data packets of the particular users may be directly set to the highest level or a higher level, and at the same time, priorities of all uplink and downlink data packets of other non-particular users are set to the lowest level or a lower level.

The priorities of service flows in the embodiment of the present invention may be marked once every several data packets, as shown in FIG. 5.

In the method for scheduling a data flow according to the embodiment of the present invention, the priority of the subsequent uplink and/or downlink data flow of the UE corresponding to the downlink data packet is marked in the downlink data packet, so that the downstream node is enabled to schedule the access network resource or the air interface resource according to the priority. Therefore, a bearer does not need to be modified during the process of distinguishing priorities of different service flows and performing differentiation scheduling on different service flows, thereby reducing the workload and improving the processing efficiency. Further, the received data packet is analyzed in a predicting manner to obtain a priority of the subsequent data flow.

Figure 7:
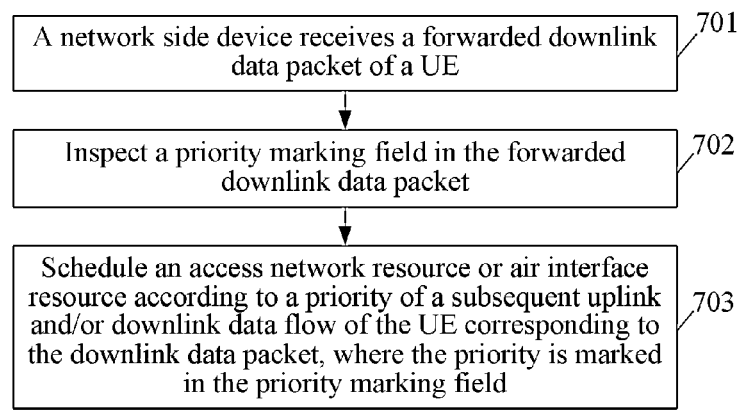
FIG. 7 is a flow chart of still another method for scheduling a data flow according to an embodiment of the present invention.

FIG. 7 is a flow chart of still another method for scheduling a data flow according to an embodiment of the present invention. This embodiment includes the following:

Step 701: A network side device receives a forwarded downlink data packet of a UE;

Step 702: Inspect a priority marking field in the forwarded downlink data packet;

Step 703: Schedule an access network resource or air interface resource according to a priority of a subsequent uplink and/or downlink data flow of the UE corresponding to the downlink data packet, where the priority is marked in the priority marking field.

An executing object of the embodiment is the network side device, for example, may be a base station or an RNC. The embodiment of the present invention is used to schedule the data flow marked in the embodiment shown in FIG. 1 or FIG. 6.

In the embodiment of the present invention, firstly the forwarded downlink data packet of the UE is received, and then the priority marking field in the forwarded downlink data packet is inspected. The priority marking field of the embodiment of the present invention may include: a differentiated services code point DSCP or type of service TOS in IPv4; or a traffic class Traffic Class, a flow label Flow Label or a field of a GPRS tunneling protocol for bearing the data packet in IPv6.

In the embodiment of the present invention, the marking manner of the priority marking field may include the following two types: one part of the priority marking field is used to mark the priority of the downlink data packet, the other part is used to mark the priority of the subsequent uplink data flow, and FIG. 3 shows a marking manner of taking DSCP as an example; or one part of the priority marking field is used to show the priority of the downlink data packet or the priority of the subsequent uplink data flow, the other part is used to show whether the priority indicates the uplink or the downlink, and FIG. 4 shows another marking manner of taking DSCP as an example. It may also be defined in this embodiment that: when the priority marking field is 0, it represents that the data packet or data flow is not detected. Therefore, the priority cannot be known. In this case, the priority marking field is 0, representing an intermediate priority.

The access network or air interface uplink resource is scheduled according to the priority of the subsequent uplink data flow marked in the priority marking field. For example, the resource can be allocated to the one with a priority of 7 preferentially, while the resource can be allocated to the one with a priority of 1 in the last.

In the method for scheduling a data flow according to the embodiment of the present invention, the priority of the subsequent uplink and/or downlink data flow of the UE corresponding to the downlink data packet is marked in the downlink data packet, so that the downstream node is enabled to schedule the access network resource or the air interface resource according to the priority. Therefore, a bearer does not need to be modified during the process of distinguishing priorities of different service flows and performing differentiation scheduling on different service flows, thereby reducing the workload and improving the processing efficiency.

Figure 8:
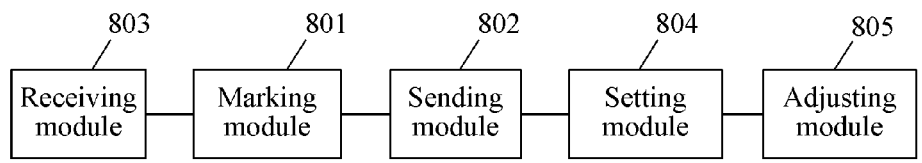
FIG. 8 is a structural diagram of still another device for scheduling a data flow according to an embodiment of the present invention.

FIG. 8 is a structural diagram of still another device for scheduling a data flow according to an embodiment of the present invention. This embodiment includes:

a marking module 801, configured to mark, in a priority marking field in a downlink data packet sent to a user equipment UE, a priority of a subsequent uplink and/or downlink data flow of the UE corresponding to the downlink data packet; and a sending module 802, configured to send the downlink data packet, so that a downstream node schedules an access network resource or air interface resource for the subsequent uplink and/or downlink data flow according to the priority.

The device according to the embodiment of the present invention may also include:

a receiving module 803, configured to receive at least one data packet, or a data packet of a period of time, obtain a service type or service content of the data packet when receiving the data packet, and predict the priority of the subsequent uplink and/or downlink data flow according to the service type or the service content of the data packet; or a setting module 804, configured to set the priority of the subsequent uplink and/or downlink data flow according to a network or operator policy.

The obtaining a service type of the data packet in the embodiment of the present invention includes:

detecting a service type of the data packet by deep packet inspection; or obtaining an IP address and/or a port of a receiving end of the uplink data packet or a sending end of the downlink data packet by shallow packet inspection, and getting a service type corresponding to the IP address and/or the port of the receiving end of the uplink data packet or the sending end of the downlink data packet according to a set correspondence between an IP address and/or port and a service type; or The obtaining service content of the data packet includes:
detecting the service content of the data packet by deep packet inspection.

The predicting the priority of the subsequent uplink and/or downlink data flow according to the service type or the service content of the data packet in the embodiment of the present invention includes:

when receiving one data packet, searching for the priority of the data packet according to the correspondence between a service type or service content and a priority and taking the priority of the data packet as the priority of the subsequent uplink and/or downlink data flow;

when receiving at least two data packets, searching for the priority of the at least two data packets according to the correspondence between a service type or service content and a priority, and taking a statistical value of the priority of the at least two data packets as the priority of the subsequent uplink and/or downlink data flow; and when receiving a data packet of a period of time, searching for the priority of the data packet of a period of time according to the correspondence between a service type or service content and a priority, and taking a statistical value of the priority of the data packet of a period of time as the priority of the subsequent uplink and/or downlink data flow.

The priority marking field in the embodiment of the present invention includes:

a differentiated services code point DSCP, type of service TOS, a traffic class Traffic Class, a flow label Flow Label or a field of a GPRS tunneling protocol for bearing the data packet;

one part of the priority marking field is used to mark the priority of the subsequent downlink data flow, and the other part is used to mark the priority of the subsequent uplink data flow, or one part of the priority marking field is used to mark the priority of the subsequent downlink data flow or the priority of the subsequent uplink data flow, and the other part is used to mark the uplink or the downlink.

The embodiment of the present invention may also include:
an adjusting module 805, configured to adjust the priority of the subsequent uplink and/or downlink data flow according to the subscription type of the UE.

The downstream node of the embodiment of the present invention may include:

a base station, a radio network controller RNC, a radio access network device, or a fixed network device.

The embodiment of the present invention is used to execute the method of the embodiment in FIG. 1 or FIG. 6.

In the method for scheduling a data flow according to the embodiment of the present invention, the priority of the subsequent uplink and/or downlink data flow of the UE corresponding to the downlink data packet is marked in the downlink data packet, so that the downstream node is enabled to schedule the access network resource or the air interface resource according to the priority. Therefore, a bearer does not need to be modified during the process of distinguishing priorities of different service flows and performing differentiation scheduling on different service flows, thereby reducing the workload and improving the processing efficiency.

Figure 9:
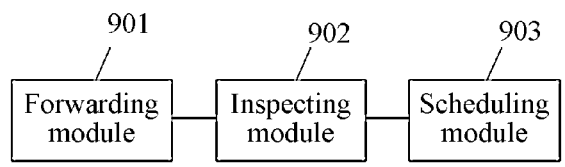
FIG. 9 is a structural diagram of still another device for scheduling a data flow according to an embodiment of the present invention.

FIG. 9 is a structural diagram of still another device for scheduling a data flow according to an embodiment of the present invention. This embodiment includes:

a forwarding module 901, configured for a network side device to receive a forwarded downlink data packet of a UE;

an inspecting module 902, configured to inspect a priority marking field in the forwarded downlink data packet; and a scheduling module 903, configured to schedule an access network resource or air interface resource according to a priority of a subsequent uplink and/or downlink data flow of the UE corresponding to the downlink data packet, where the priority is marked in the priority marking field.

The priority marking field in the embodiment of the present invention may include:

a differentiated services code point DSCP, type of service TOS, a traffic class Traffic Class, a flow label Flow Label or a field of a GPRS tunneling protocol for bearing the data packet;

and/or one part of the priority marking field is used to mark the priority of the subsequent downlink data flow, and the other part is used to mark the priority of the subsequent uplink data flow, or one part of the priority marking field is used to mark the priority of the subsequent downlink data flow or the priority of the subsequent uplink data flow, and the other part is used to mark the uplink or the downlink.

The embodiment of the present invention is used to execute the method of the embodiment in FIG. 7.

In the method for scheduling a data flow according to the embodiment of the present invention, the priority of the subsequent uplink and/or downlink data flow of the UE corresponding to the downlink data packet is marked in the downlink data packet, so that the downstream node is enabled to schedule the access network resource or the air interface resource according to the priority. Therefore, a bearer does not need to be modified during the process of distinguishing priorities of different service flows and performing differentiation scheduling on different service flows, thereby reducing the workload and improving the processing efficiency.

Figure 10:
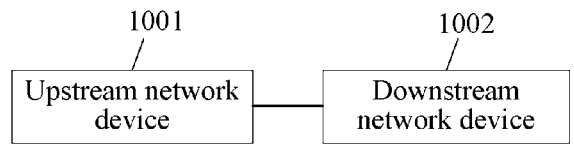
FIG. 10 is a structural diagram of still another device for scheduling a data flow according to an embodiment of the present invention.

FIG. 10 is a structural diagram of still another device for scheduling a data flow according to an embodiment of the present invention. This embodiment includes:

an upstream network device 1001, configured to mark, in a priority marking field in a downlink data packet sent to a user equipment UE, a priority of a subsequent uplink and/or downlink data flow of the UE corresponding to the downlink data packet; and send the downlink data packet, so that a downstream node schedules an access network resource or air interface resource for the subsequent uplink and/or downlink data flow according to the priority; and a downstream network device 1002, configured for a network side device to receive the forwarded downlink data packet of the UE; inspect the priority marking field in the forwarded downlink data packet; and schedule the access network resource or the air interface resource according to the priority of the subsequent uplink and/or downlink data flow of the UE corresponding to the downlink data packet, where the priority is marked in the priority marking field.

The embodiment of the present invention is used to execute the method of the embodiment in FIG. 1, FIG. 2 or FIG. 7.

In the method for scheduling a data flow according to the embodiment of the present invention, the priority of the subsequent uplink and/or downlink data flow of the UE corresponding to the downlink data packet is marked in the downlink data packet, so that the downstream node is enabled to schedule the access network resource or the air interface resource according to the priority. Therefore, a bearer does not need to be modified during the process of distinguishing priorities of different service flows and performing differentiation scheduling on different service flows, thereby reducing the workload and improving the processing efficiency.

Through the above description of the embodiments, it is clear to persons skilled in the art that the present invention may be implemented by software plus necessary universal hardware, and definitely may also be implemented by hardware, but in many cases, the software implementation is preferred. Based on such an understanding, the technical solutions of the present invention essentially, or the part contributing to the prior art may be implemented in the form of a software product. The computer software product is stored in a readable storage medium, for example, a floppy disk, a hard disk, or an optical disk of the computer, and includes several instructions for instructing a computer device (which may be a personal computer, a server, a network device, and the like) to execute the methods described in the embodiments of the present invention.

The foregoing descriptions are merely specific embodiments of the present invention, but are not intended to limit the protection scope of the present invention. Any variation or replacement made by persons skilled in the art within the technical scope disclosed in the present invention shall all fall within the protection scope of the present invention. Therefore, the protection scope of the present invention shall fall within the protection scope defined by the appended claims.

What is claimed is:

1. A method for scheduling a data flow, comprising:
   marking, by a network side device, in a priority marking field in a downlink data packet sent to a user equipment (UE), a priority of a subsequent uplink and/or downlink data flow of the UE corresponding to the downlink data packet; and
   sending the downlink data packet, so that a downstream node schedules an access network resource or air interface resource for the subsequent uplink and/or downlink data flow according to the priority;
   wherein the method further comprising:
   receiving at least one data packet, or a data packet of a period of time, obtaining a service type or service content of the data packet when receiving the data packet, and predicting the priority of the subsequent uplink and/or downlink data flow according to the service type or the service content of the data packet; or setting the priority of the subsequent uplink and/or downlink data flow according to a network or operator policy;
   wherein the predicting the priority of the subsequent uplink and/or downlink data flow according to the service type or the service content of the data packet comprises at least one of the following:
   when receiving one data packet, searching for a priority of the data packet according to correspondence between a service type or service content and a priority and taking the priority of the data packet as the priority of the subsequent uplink and/or downlink data flow;
   when receiving at least two data packets, searching for a priority of the at least two data packets according to correspondence between a service type or service content and a priority, and taking a statistical value of the priority of the at least two data packets as the priority of the subsequent uplink and/or downlink data flow;
   when receiving a data packet of a period of time, searching for a priority of the data packet of a period of time according to correspondence between a service type or service content and a priority, and taking a statistical value of the priority of the data packet of a period of time as the priority of the subsequent uplink and/or downlink data flow.

2. The method according to claim 1, wherein
   the obtaining a service type of the data packet comprises:
   detecting the service type of the data packet by deep packet inspection; or
   obtaining an IP address and/or a port of a receiving end of an uplink data packet or a sending end of a downlink data packet by shallow packet inspection, and obtaining a service type corresponding to the IP address and/or the port of the receiving end of the uplink data packet or the sending end of the downlink data packet according to set correspondence between an IP address and/or port and a service type;
   or
   the obtaining service content of the data packet comprises:
   detecting the service content of the data packet by deep packet inspection.

3. The method according to claim 1, wherein the priority marking field comprises:
   a differentiated services code point (DSCP), type of service (TOS), a traffic class Traffic Class, a flow label Flow Label or a field of a GPRS tunneling protocol for bearing the data packet;
   and/or
   one part of the priority marking field is used to mark a priority of a subsequent downlink data flow, and the other part is used to mark a priority of a subsequent uplink data flow, or
   one part of the priority marking field is used to mark the priority of the subsequent downlink data flow or the priority of the subsequent uplink data flow, and the other part is used to mark an uplink or a downlink.

4. The method according to claim 1, further comprising:
   adjusting the priority of the subsequent uplink and/or downlink data flow according to a subscription type of the UE.

5. The method according to claim 1, wherein the downstream node comprises:
a base station, a radio network controller (RNC), a radio access network device, or a fixed network device.

6. A device for scheduling a data flow, comprising:
a processor and a non-transitory processor-readable medium having processor-executable instructions stored thereon, the processor-executable instructions including a marking module, configured to mark, in a priority marking field in a downlink data packet sent to a user equipment (UE), a priority of a subsequent uplink and/or downlink data flow of the UE corresponding to the downlink data packet;
a sending module, configured to send the downlink data packet, so that a downstream node schedules an access network resource or air interface resource for the subsequent uplink and/or downlink data flow according to the priority; and
a receiving module, configured to receive at least one data packet, or a data packet of a period of time, obtain a service type or service content of the data packet when receiving the data packet, and predict a priority of a subsequent uplink and/or downlink data flow according to the service type or the service content of the data packet; or a setting module, configured to set the priority of the subsequent uplink and/or downlink data flow according to a network or operator policy;
wherein the device is configured to:
when receiving one data packet, search for a priority of the data packet according to correspondence between a service type or service content and a priority and taking the priority of the data packet as the priority of the subsequent uplink and/or downlink data flow;
when receiving at least two data packets, search for a priority of the at least two data packets according to correspondence between a service type or service content and a priority, and take a statistical value of the priority of the at least two data packets as the priority of the subsequent uplink and/or downlink data flow;
when receiving a data packet of a period of time, search for a priority of the data packet of a period of time according to correspondence between a service type or service content and a priority, and take a statistical value of the priority of the data packet of a period of time as the priority of the subsequent uplink and/or downlink data flow.

7. The device according to claim 6, wherein
the device is configured to:
detect the service type of the data packet by deep packet inspection; or
obtain an IP address and/or a port of a receiving end of an uplink data packet or a sending end of a downlink data packet by shallow packet inspection, and obtain a service type corresponding to the IP address and/or the port of the receiving end of the uplink data packet or the sending end of the downlink data packet according to a set correspondence between an IP address and/or port and a service type;
or
the device is configured to:
detect the service content of the data packet by deep packet inspection.

8. The device according to claim 6, wherein the priority marking field comprises:
a differentiated services code point (DSCP), type of service (TOS), a traffic class Traffic Class, a flow label Flow Label or a field of a GPRS tunneling protocol for bearing the data packet;
and/or
one part of the priority marking field is used to mark a priority of a subsequent downlink data flow, and the other part is used to mark a priority of a subsequent uplink data flow, or
one part of the priority marking field is used to mark the priority of the subsequent downlink data flow or the priority of the subsequent uplink data flow, and the other part is used to mark an uplink or a downlink.

9. The device according to claim 6, further comprising:
an adjusting module, configured to adjust the priority of the subsequent uplink and/or downlink data flow according to a subscription type of the UE.

10. The device according to claim 6, wherein the downstream node comprises:
a base station, a radio network controller (RNC), a radio access network device, or a fixed network device.

* * * * *